(12) United States Patent
Goya et al.

(10) Patent No.: US 11,583,957 B2
(45) Date of Patent: Feb. 21, 2023

(54) LASER PROCESSING METHOD AND LASER PROCESSING APPARATUS

(71) Applicant: MITSUBISHI HEAVY INDUSTRIES, LTD., Tokyo (JP)

(72) Inventors: Saneyuki Goya, Tokyo (JP); Ryuichi Narita, Munich (DE); Rudolf Weber, Stuttgart (DE); Christian Freitag, Stuttgart (DE); Ehsan Zahedi, Stuttgart (DE)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 372 days.

(21) Appl. No.: 16/784,991

(22) Filed: Feb. 7, 2020

(65) Prior Publication Data
US 2020/0306889 A1 Oct. 1, 2020

(30) Foreign Application Priority Data

Mar. 25, 2019 (JP) .............................. JP2019-057450

(51) Int. Cl.
*B23K 26/382* (2014.01)
*B23K 26/062* (2014.01)
(Continued)

(52) U.S. Cl.
CPC .......... *B23K 26/382* (2015.10); *B23K 26/062* (2015.10); *B23K 26/0624* (2015.10); *B23K 26/082* (2015.10); *B23K 26/14* (2013.01)

(58) Field of Classification Search
CPC .......... B23K 26/02; B23K 26/06–0604; B23K 26/062–0624; B23K 26/08–0821;
(Continued)

(56) References Cited

U.S. PATENT DOCUMENTS 6,781,092 B2 * 8/2004 De Steur .............. H05K 3/0032
219/121.79
9,950,392 B2 * 4/2018 Tiwari .................. B23K 26/082
(Continued)

FOREIGN PATENT DOCUMENTS

JP          4-28490        1/1992
JP       2001-269793      10/2001
(Continued)

OTHER PUBLICATIONS

Office Action dated Mar. 22, 2021 in corresponding Canadian Patent Application No. 3,071,681.
(Continued)

*Primary Examiner* — Jimmy Chou
(74) *Attorney, Agent, or Firm* — Wenderoth, Lind & Ponack, L.L.P.

(57) ABSTRACT

A laser processing method includes a first step of irradiating a surface of a composite material with a laser to form a hole processing groove on the composite material by scanning first paths from an outside corresponding to an inner peripheral surface side of a through hole to be formed to an inside corresponding to a center side of the through hole to be formed, the first paths extending across a width direction of the hole processing groove; and a second step of irradiating and penetrating through the hole processing groove with the laser to form the through hole by scanning second paths from the outside to the inside after the first step, the second paths extending across the width direction of the hole processing groove. The laser used at the first step has a smaller heat input amount per unit time than the laser used at the second step.

12 Claims, 6 Drawing Sheets

(51) Int. Cl.
*B23K 26/0622* (2014.01)
*B23K 26/082* (2014.01)
*B23K 26/14* (2014.01)

(58) Field of Classification Search
CPC ............ B23K 26/14; B23K 26/38–388; B23K 26/082; B23K 26/382
USPC .......................................... 219/121.7, 121.71
See application file for complete search history.

(56) References Cited

U.S. PATENT DOCUMENTS

| | | | | |
|---|---|---|---|---|
| 2004/0140299 | A1* | 7/2004 | Arai | H05K 3/0026 |
| | | | | 219/121.71 |
| 2010/0282727 | A1* | 11/2010 | Kobayashi | B23K 26/389 |
| | | | | 219/121.7 |
| 2013/0200051 | A1* | 8/2013 | Hert | B23K 26/38 |
| | | | | 219/121.67 |
| 2015/0224600 | A1* | 8/2015 | Spiess | B23K 26/032 |
| | | | | 219/121.72 |
| 2017/0225271 | A1 | 8/2017 | Goodman et al. | |
| 2019/0176271 | A1* | 6/2019 | Goya | B23K 26/0613 |

FOREIGN PATENT DOCUMENTS

| | | |
|---|---|---|
| JP | 2016-107574 | 6/2016 |
| JP | 2018-16525 | 2/2018 |
| WO | 2017/221931 | 12/2017 |

OTHER PUBLICATIONS

Extended Search Report dated Aug. 27, 2020 in corresponding European Patent Application No. 20156433.3.

Office Action dated Dec. 20, 2022 in Japanese Patent Application No. 2019-057450, with English translation.

* cited by examiner

LASER PROCESSING METHOD AND LASER PROCESSING APPARATUS

CROSS-REFERENCE TO RELATED APPLICATIONS

The present application claims priority to and incorporates by reference the entire contents of Japanese Patent Application No. 2019-057450 filed in Japan on Mar. 25, 2019.

FIELD

The present invention relates to a laser processing method and a laser processing apparatus for irradiating a composite material with a laser and processing the composite material.

BACKGROUND

Laser processing has high-energy density, is effective in shortening a processing time, and is expected to have the same effects on fiber reinforced plastic composite materials such as carbon fiber reinforced plastics (CFRP), glass fiber reinforced plastics (GFRP), and glass mat reinforced thermoplastics (GMT). There has been known a laser processing method of a composite material for executing a first step of irradiating a part to be processed of a composite material with a high output power laser beam on multiple paths in the form of multiple lines at a high sweep speed, and a second step of reducing a degree of the multiple lines when a processing depth increases sequentially along with the progress of the first step (for example, see Japanese Patent Application Publication No. 2016-107574, hereinafter "JP 2016-107574").

SUMMARY

Technical Problem

In drilling processing of a composite material, a through hole in a straight shape with a small inclination on a wall surface of a processing hole may be formed. When the laser processing method of JP 2016-107574 is applied in order to form a through hole in a composite material using a laser, a degree of multiple lines is reduced and a wall surface of a through hole 50 has an inclination as illustrated in FIG. 6. Thus, it is difficult to form the through hole 50 into a straight shape. In other words, at the second step, a degree of multiple lines is reduced as compared with the degree at a first step, and a length of a radial direction of the through hole orthogonal to a depth direction of the through hole is narrower as a depth of the through hole is deeper. Thus, a through hole is formed into a tapered shape that is narrower toward a depth direction. In a composite material having a thick sheet thickness, this inclination is noticeable, and the inclination needs to be corrected by reaming and the like after laser processing, thereby extending a processing time.

In the laser processing method of JP 2016-107574, a degree of multiple lines at the first step is larger than that at the second step, and spatters 51 after laser processing are increased on a surface by widening a cutting width, thereby causing more spatters 51 and fumes (high-temperature gas formed by subliming a material to be processed with a laser) to be attached to a surface of a composite material.

An object of the present invention is to provide a laser processing method and a laser processing apparatus capable of reducing spatters on a surface of a composite material and performing processing with excellent characteristics in the aspect of processing quality such as a processed shape and a heat-affected layer.

Solution to Problem

A laser processing method according to an aspect of the present invention is for performing hole processing in which a composite material is irradiated with a laser to form a through hole. The laser processing method includes a first step of irradiating a surface of the composite material with the laser to form a hole processing groove on the composite material in a manner of scanning a plurality of paths from an outside corresponding to an inner peripheral surface side of the through hole to be formed to an inside corresponding to a center side of the through hole, the plurality of paths being across a width direction of the hole processing groove; and a second step of irradiating and penetrating through the hole processing groove with the laser to form the through hole in a manner of scanning a plurality of paths from the outside to the inside after the first step, the plurality of paths being across the width direction of the hole processing groove. The laser used at the first step has a smaller heat input amount per unit time than the laser used at the second step.

With this configuration, at the first step, a hole processing groove can be formed on a surface of a composite material with a reduced heat input amount per unit time. Thus, a heat-affected layer can be prevented from being formed on a surface of a composite material. In addition, a generation amount of fumes can be reduced and the fumes can be prevented from being attached to a surface of a composite material because a heat input amount per unit time added to the surface of the composite material can be made smaller. At the second step, by emitting a laser on a plurality of paths so that the laser is directed from the outside to the inside of a through hole, a hole processing groove can be formed deeper along with an irradiation direction of the laser. Thus, a through hole formed by a laser can be formed in a straight shape in an irradiation direction of the laser. When an aperture of a through hole is round, a plurality of paths may be concentrically arranged or may be spirally connected.

Preferably, the number of paths of the laser at the second step is equal to or more than the number of paths of the laser at the first step.

With this configuration, at the second step, a laser can be emitted with the number of paths equal to or more than the number of paths at the first step. Thus, a length of a hole processing groove in a width direction can be prevented from being shorter than the length at the first step.

Preferably, a scan speed of the laser at the first step is faster than a scan speed of the laser at the second step.

With this configuration, by making a scan speed of a laser faster than the scan speed at the second step, a heat input amount for a composite material by laser irradiation at the first step can be made smaller without changing irradiation conditions at the first step and the second step. It is preferable that a scan speed at the first step be made faster, more than double a scan speed at the second step.

Preferably, output of the laser at the first step is smaller than output of the laser at the second step.

With this configuration, by making output of a laser smaller than output at the second step, a heat input amount per unit time by laser irradiation at the first step of a composite material can be made smaller without changing a scan speed of the laser at the first step and the second step.

Preferably, at the first step and the second step, the plurality of paths include three paths or more, and pitches between the plurality of paths are the same in the width direction.

With this configuration, the pitch between a plurality of respective paths at the first step is the same interval to equalize a groove depth of a hole processing groove. Similarly, the pitch between a plurality of respective paths at the second step is the same interval to equalize a groove depth of a hole processing groove.

Preferably, irradiation of the laser is started from the inner peripheral surface corresponding to a product surface of the through hole at the second step.

With this configuration, hole processing can be performed on an inner peripheral surface of a through hole corresponding to a product surface with high accuracy.

Preferably, the laser is an ultrashort pulse laser or a short pulse laser.

Processing using a laser serving as a continuous wave (CW) is basically heat processing, and generating spatters depending on a heat input amount is inevitable. However, if an ultrashort pulse laser or a short pulse laser is used as a laser, a pulse width is shortened, and processing can be non-heat processing to reduce a generation amount of spatters and fumes. Thus, irradiating a composite material with a laser enables generated spatters to be reduced and fumes to be decreased. Fine fumes generated at the first step easily float to reduce attachment to a composite material. An ultrashort pulse laser is a laser oscillator referred to as a picosecond laser and a femtosecond laser, and a pulse width thereof indicates a nanosecond or less. A short pulse laser means that a pulse width thereof ranges from a nanosecond to a microsecond. For example, a picosecond laser has a pulse interval of 10 picoseconds and 800 picoseconds, and a femtosecond laser has a pulse interval of 100 femtoseconds and 900 femtoseconds. A short pulse laser is a laser having a pulse interval of several nanoseconds, 100 nanoseconds, or 10 microseconds.

Preferably, the first step includes spraying assist gas toward the hole processing groove to be formed, from a lateral direction intersecting an irradiation direction of the laser.

With this configuration, by spraying assist gas using a gas nozzle from a lateral direction of a base material to be processed in order to remove spatters generated upon laser irradiation, fumes generated by irradiating a composite material with a laser can be forcibly removed by the assist gas. Thus, at the first step, fumes attached to a composite material can be prevented from being generated. At the second step, assist gas may be also sprayed onto a composite material.

Preferably, the method further includes a third step of irradiating, after the second step, the through hole with the laser in a manner of scanning a plurality of paths having a narrower pitch than a pitch between the plurality of paths in the width direction at the second step.

With this configuration, hole processing can be performed on an inner peripheral surface of a through hole with high accuracy. At the third step, the number of paths of a laser may be increased and may be the same number as much as the pitch is made narrower. When the number of paths of a laser is the same number, irradiation of a laser may be started from an inner peripheral surface side of a through hole.

A laser processing apparatus according to another aspect of the present invention performs hole processing in which a composite material is irradiated with a laser to form a through hole. The laser processing apparatus includes a laser irradiating unit configured to irradiate a surface of the composite material with an ultrashort pulse laser or a short pulse laser as the laser; a laser scanner configured to cause the laser to scan; a gas nozzle configured to spray assist gas toward a surface of the composite material and spray assist gas in a lateral direction intersecting an irradiation direction of the laser; and a controller configured to control operations of the laser irradiating unit and the laser scanner.

With this configuration, by irradiating a composite material with an ultrashort pulse laser or a short pulse laser, generated fumes can be made finer than fumes using a CW laser. At this time, by spraying assist gas toward a surface of a composite material, fine fumes can be blown away and the fumes can be prevented from being attached to the surface of the composite material.

Preferably, the controller executes a first step of irradiating a surface of the composite material with the laser to form a hole processing groove on the composite material in a manner of scanning a plurality of paths from an outside corresponding to an inner peripheral surface side of the through hole to be formed to an inside corresponding to a center side of the through hole, the plurality of paths being across a width direction of the hole processing groove; and a second step of irradiating and penetrating through the hole processing groove with the laser to form the through hole in a manner of scanning a plurality of paths from the outside to the inside after the first step, the plurality of paths being across the width direction of the hole processing groove. The laser used at the first step has a smaller heat input amount per unit time than the laser used at the second step.

With this configuration, at the first step, a hole processing groove can be formed on a surface of a composite material with a reduced heat input amount per unit time. Thus, a heat-affected layer can be prevented from being formed on a surface of a composite material, and spatters and fumes can be prevented from being attached to the surface. At the second step, by emitting a laser on a plurality of paths so that the laser is directed from the outside to the inside of a through hole, a hole processing groove can be cut off along with an irradiation direction of the laser. Thus, a through hole formed by a laser can be formed in a straight shape in an irradiation direction of the laser.

DESCRIPTION OF EMBODIMENTS

Embodiments according to the present invention will now be described in detail with reference to the accompanying drawings. It should be noted that the embodiments are not intended to limit this invention. Components in the following embodiments include components that can be replaced and are facilitated by the skilled person or substantially like components. Components described below can be combined as appropriate. When there are a plurality of the embodiments, each of the embodiments can be combined.

First Embodiment

Figure 1:
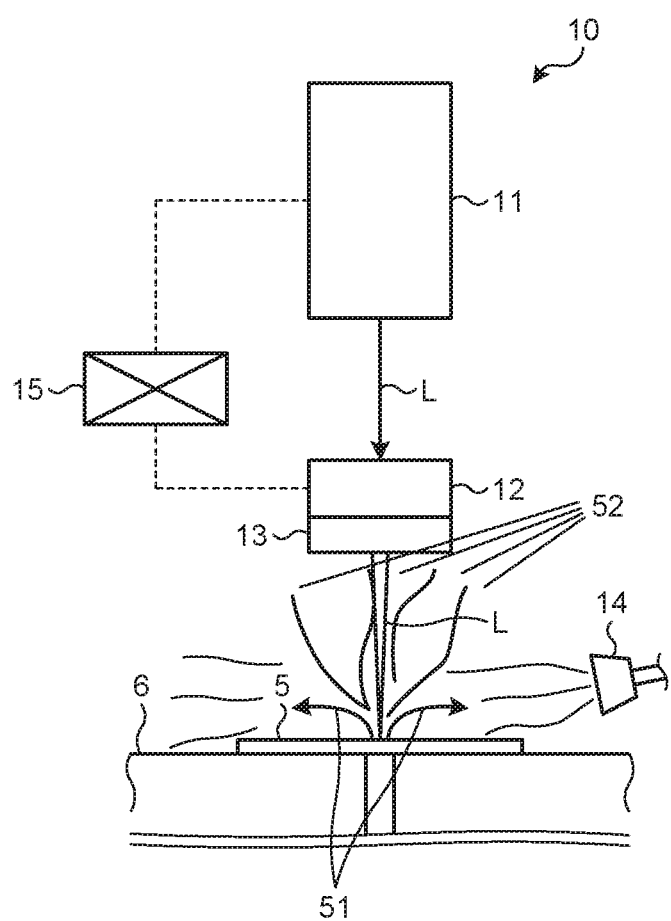
FIG. 1 is a view schematically illustrating a laser processing apparatus in accordance with a first embodiment.

FIG. 1 is a view schematically illustrating a laser processing apparatus in accordance with a first embodiment. As illustrated in FIG. 1, a laser processing apparatus 10 according to a first embodiment is an apparatus capable of irradiating a composite material 5 to be processed with a laser L to perform hole processing on the composite material 5.

Examples of the composite material 5 include fiber reinforced plastics such as carbon fiber reinforced plastics (CFRP), glass fiber reinforced plastics (GFRP), and glass mat reinforced thermoplastics (GMT).

As illustrated in FIG. 1, the laser processing apparatus 10 includes a laser oscillator 11, a scanning optical system 12, a condensing optical system 13, a support base 6, a gas nozzle 14, and a controller 15.

The laser oscillator 11 is an apparatus that outputs the laser L. The laser oscillator 11 used in the first embodiment uses a pulse oscillation (pulsed operation) system, and is an ultrashort pulse laser that outputs the ultrashort pulse laser L. The ultrashort pulse laser has a pulse width that ranges from several picoseconds to several femtoseconds. The first embodiment will be described with application of an ultrashort pulse laser, but a short pulse laser may be applied. The short pulse laser has a pulse width of several nanoseconds, 100 nanoseconds, or 10 microseconds.

The scanning optical system 12 is an optical system that causes the laser L emitted from the laser oscillator 11 to scan on the composite material 5. The scanning optical system 12 includes a scanner that can operate the laser on the surface of the composite material 5. As a scanner, a prism rotor for rotating a prism or a galvanometer mirror is used, for example.

The condensing optical system 13 is an optical system that condenses the laser L emitted from the scanning optical system 12 and irradiates the composite material 5 with the condensed laser L. The condensing optical system 13 includes optical elements such as a condenser lens.

The support base 6 supports the composite material 5 at a predetermined position. The support base 6 may be a moving stage that causes the composite material 5 to be moved on a horizontal plane. With the laser L emitted from the laser oscillator 11, a surface of the composite material 5 arranged on the support base 6 is irradiated almost vertically.

The gas nozzle 14 sprays inactive assist gas toward a surface of the composite material 5. A spraying direction of assist gas is a lateral direction intersecting an irradiation direction of the laser L, and is a direction along with a surface of the composite material 5. A suction aperture for sucking assist gas, which is not illustrated, is provided to a side opposite to the gas nozzle 14 across the composite material 5.

The controller 15 is connected to each of the units including the laser oscillator 11 and the scanning optical system 12, and controls each of the units to control operations of the laser processing apparatus 10. For example, the controller 15 controls the laser oscillator 11 to adjust irradiation conditions of the laser L emitted from the laser oscillator 11. For example, the controller 15 controls the scanning optical system 12 to control scanning operations of the laser L on a surface of the composite material 5.

In the laser processing apparatus 10 formed as above, the laser oscillator 11 emits the laser L, and the emitted laser L is guided to the scanning optical system 12. The laser processing apparatus 10 causes the laser L having entered the scanning optical system 12 to scan to vary an irradiation position of the laser L on a surface of the composite material 5. The laser processing apparatus 10 causes the laser L emitted from the scanning optical system 12 to enter the condensing optical system 13, and irradiates the composite material 5 with the condensed laser L.

Figure 2:
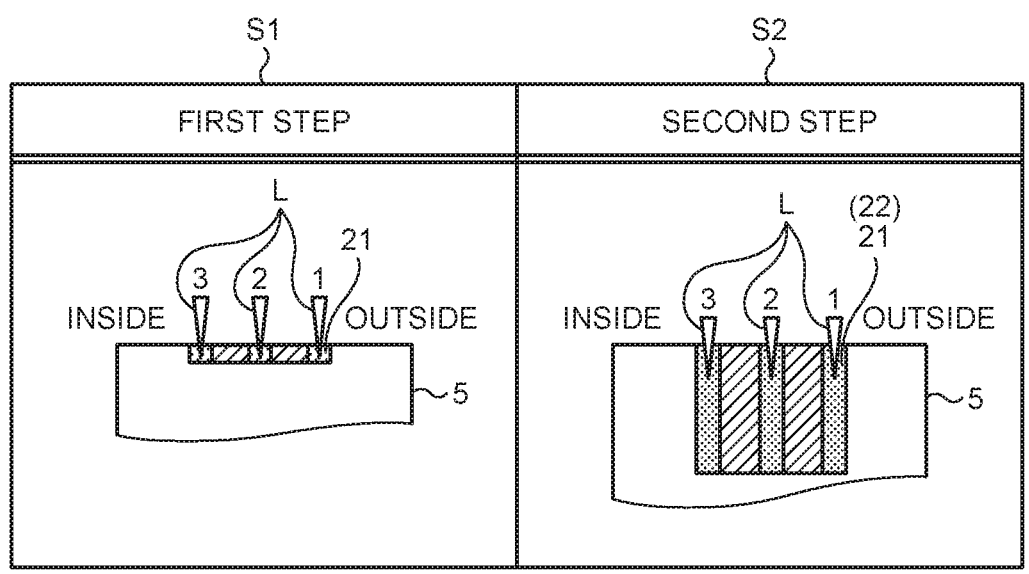
FIG. 2 is an explanatory view related to processing conditions of a laser processing method in accordance with the first embodiment.
Figure 3:
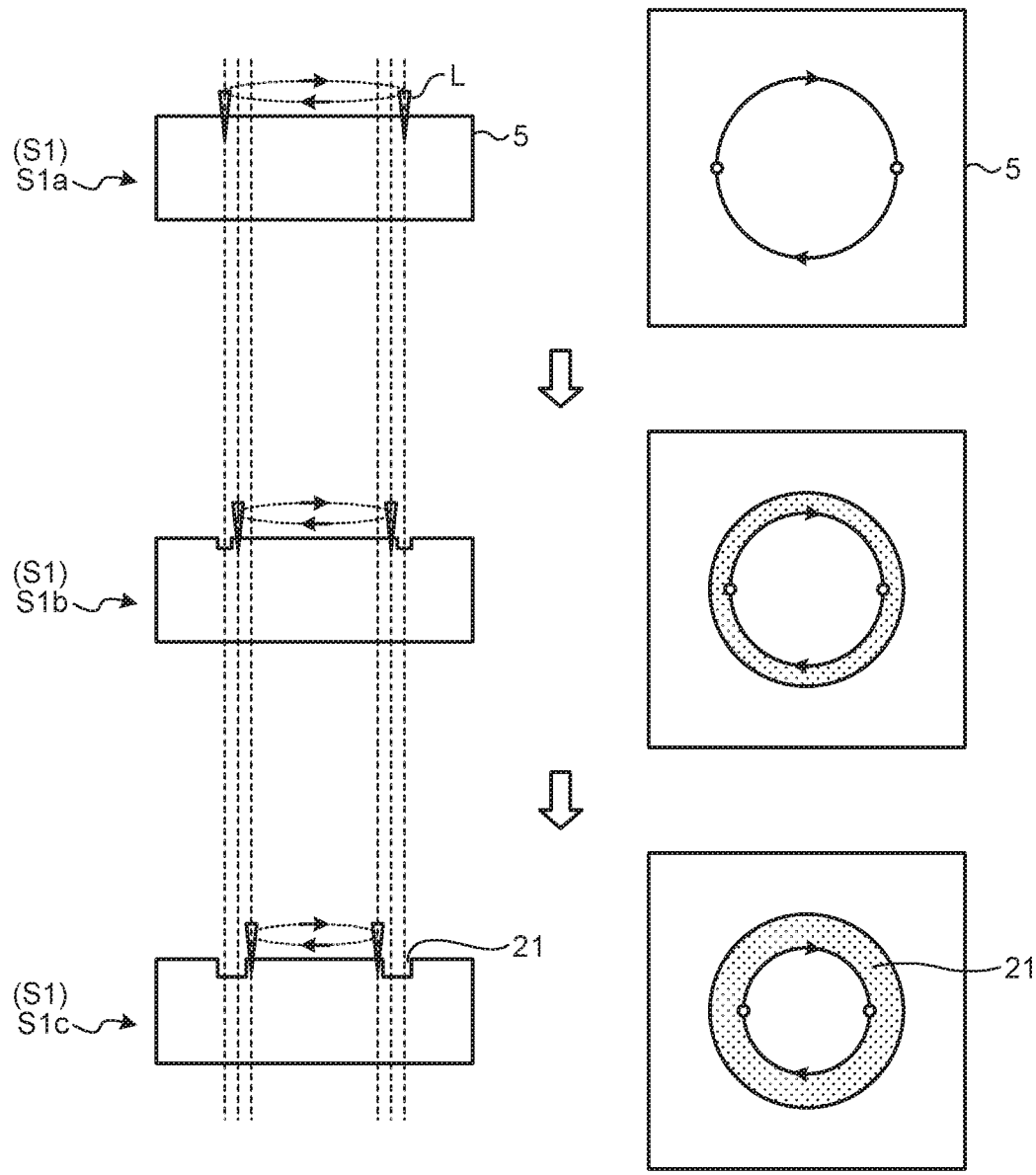
FIG. 3 is an explanatory view related to a first step of the laser processing method in accordance with the first embodiment.
Figure 4:
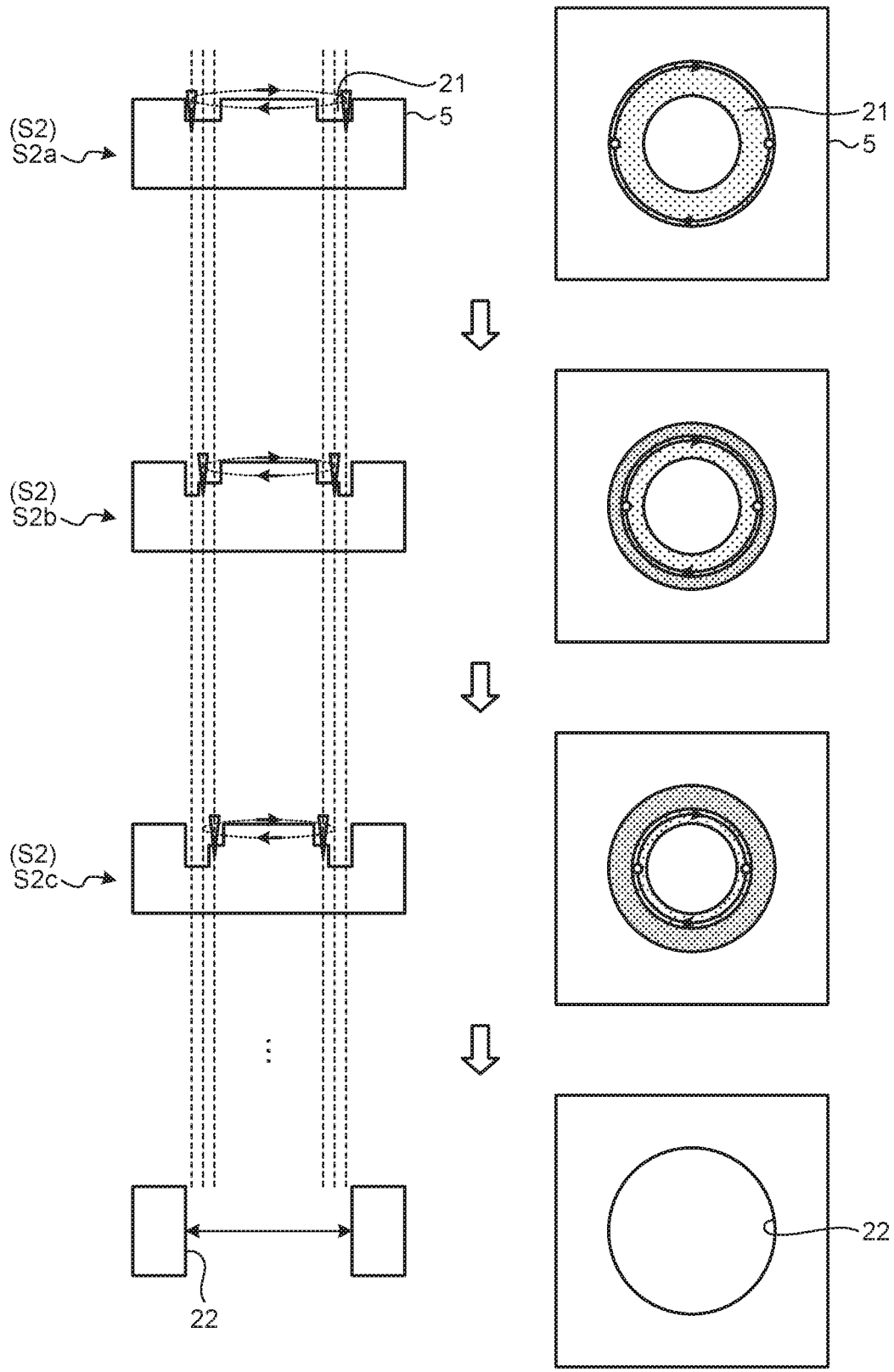
FIG. 4 is an explanatory view related to a second step of the laser processing method in accordance with the first embodiment.

With reference to FIGS. 2 to 4, using the above laser processing apparatus 10, a laser processing method for performing hole processing of a through hole on the composite material 5 will be described. FIG. 2 is an explanatory view related to processing conditions of the laser processing method in accordance with the first embodiment. FIG. 3 is an explanatory view related to a first step of the laser processing method in accordance with the first embodiment. FIG. 4 is an explanatory view related to a second step of the laser processing method in accordance with the first embodiment. The composite material 5 has, for example, a sheet thickness of 10 mm or more.

The laser processing method includes a first step S1 for irradiating a surface of the composite material 5 with the laser L and forming a hole processing groove 21 in the composite material 5, and a second step S2 for irradiating and penetrating through the hole processing groove 21 with the laser L to form a through hole 22. At the first step S1 and the second step S2, irradiation conditions of the laser L emitted from the laser oscillator 11 are the same irradiation conditions. As a specific example, in the laser processing method of the first embodiment, the laser oscillator 11 emits the picosecond laser L on the irradiation conditions that, in the laser having a pulse width of 10 ps or less and a wavelength of 1,030 nm, pulse repetition frequency and the maximum pulse energy are defined as 100 to 500 kHz and as 2.0 mJ, respectively, and the average output ranges from 200 to 1,000 w.

When the through hole 22 is formed by laser processing, at the first step S1, the hole processing groove 21 to be formed is made to be a groove having an annular shape on a surface of the composite material 5 as illustrated in FIGS. 2 and 3. At the second step S2, the hole processing groove 21 is penetrated through, and a core material inside the hole processing groove 21 is removed to form the through hole 22 into a columnar shape (straight shape) as illustrated in FIGS. 2 and 4.

FIG. 2 illustrates a cutting surface orthogonal to the peripheral direction of the hole processing groove 21 formed into an annular shape. In FIG. 2, one side of a radial direction of the hole processing groove 21 (left side in FIG. 2) corresponds to the inside, and the other side of the radial direction of the hole processing groove 21 (right side in FIG. 2) corresponds to the outside. A surface on the outside of the hole processing groove 21 corresponds to an inner peripheral surface of the through hole 22. At the first step, the hole processing groove 21 is processed so that the depth thereof is, for example, 0.5 mm. In other words, at the first step S1, processing is laser processing in which a length in a depth direction is shorter than the length at the second step S2.

At the first step S1, the laser L which causes a smaller heat input amount for the composite material 5 per unit time than that at the second step S2 is emitted. Specifically, at the first step S1, a scanning speed (scan speed) of the laser L is made faster than that at the second step S2. In this case, irradiation conditions of the laser L are the same irradiation conditions at the first step S1 and the second step S2. Thus, a heat input amount for the composite material 5 can be made smaller as much as a scanning speed at the first step S1 is faster.

As illustrated in FIG. 2, at the first step S1, on a plurality of paths aligned in a width direction (radial direction) of the hole processing groove 21, the laser L is emitted. In the first embodiment, for example, the laser L is emitted on 3 paths. The 3 paths are defined so that the pitch between the respective paths is the same interval. At the first step S1, the laser L scans and is emitted so that the laser L is directed from the outside path corresponding to an inner peripheral surface side of the through hole 22 to the inside path corresponding to a center side of the through hole 22. In other words, the hole processing groove 21 is formed into an annular shape, and, at the first step S1, the laser L is revolved in a peripheral direction three times from the outside to the inside to form the hole processing groove 21.

As illustrated in FIG. 3, at the first step S1, the laser L scans the outside of the hole processing groove 21 to be formed, in other words, an inner peripheral surface side of the through hole 22 to be formed on a peripheral direction for one revolution to perform irradiation of the first path (step S1a). Subsequently, after execution of the processing at the step S1a, the laser L scans the inside by a predetermined pitch from the first path and scans the inside of the first path in a peripheral direction for one revolution to perform irradiation of the second path (step S1b). Furthermore, after execution of the processing at the step S1b, the laser L scans the inside by a predetermined pitch from the second path and scans the inside of the second path, in other words, the inside of the hole processing groove 21 to be formed in a peripheral direction for one revolution to perform irradiation of the third path (step S1c). In this manner, executing the processing at the first step S1 causes the hole processing groove 21 having a predetermined depth to be formed. In this case, when the laser L is emitted on the first path to the third path, scanning operations of the laser L may be set so that the scanning operations are concentrically performed on the first path to the third path, and may be set so that the scanning operations are spirally continued on the first path to the third path. Processing at the first step S1 may be repeated a predetermined number of times.

At the first step S1, the composite material 5 is irradiated with the laser L to generate spatters 51 and fumes 52. At the first step S1, upon processing the hole processing groove 21 by the laser L, assist gas is sprayed from the gas nozzle 14 toward a surface of the composite material 5 and assist gas including the spatters 51 and the fumes 52 is sucked from a suction aperture, which is not illustrated. In this manner, at the first step S1, the spatters 51 and the fumes 52 are removed.

At the second step S2, the laser L which causes a larger heat input amount for the composite material 5 per unit time than that at the first step S1 is emitted. Specifically, at the second step S2, a scanning speed (scan speed) of the laser L is made slower than that at the first step S1. In this case, irradiation conditions of the laser L are the same irradiation conditions at the first step S1 and the second step S2. Thus, a heat input amount for the composite material 5 per unit time can be made larder as much as a scanning speed at the second step S2 is slower, and cutting efficiency can be improved.

As illustrated in FIG. 2, at the second step S2, on a plurality of paths aligned in a width direction (radial direction) of the hole processing groove 21, the laser L is emitted. In the first embodiment, for example, the laser L is emitted on 3 paths similarly to the processing at the first step S1. At the second step S2, the number of paths is the same as that at the first step S1, but the number of paths may be larger than that at the first step S1. The 3 paths are defined so that the pitch between the respective paths is the same interval. At the second step S2, the laser L scans and is emitted so that the laser L is directed from the outside path corresponding to an inner peripheral surface side of the through hole 22 to the inside path corresponding to a center side of the through hole 22 similarly to the processing at the first step S1. In other words, the hole processing groove 21 is formed into an annular shape, and, even at the second step S2, the laser L is revolved in a peripheral direction three times from the outside to the inside to process and penetrate through the hole processing groove 21 in a depth direction. In this case, at the second step S2, irradiation of the laser L is started from an inner peripheral surface corresponding to a product surface of the through hole 22 to be formed.

As illustrated in FIG. 4, at the second step S2, the laser L scans the outside of the hole processing groove 21, in other words, an inner peripheral surface side of the through hole 22 to be formed in a peripheral direction for one revolution to perform irradiation of the first path (step S2a). Subsequently, after execution of the processing at the step S2a, the laser L scans the inside by a predetermined pitch from the first path and scans the inside of the first path in a peripheral direction for one revolution to perform irradiation of the second path (step S2b). Furthermore, after execution of the processing at the step S2b, the laser L scans the inside by a predetermined pitch from the second path and scans the inside of the second path, in other words, the inside of the hole processing groove 21 in a peripheral direction for one revolution to perform irradiation of the third path (step S2c). In this manner, executing processing at the second step S2 causes further processing to be performed on the hole processing groove 21 in a depth direction. Processing at the second step S2 is repeated until the hole processing groove 21 is penetrated through in a depth direction.

Even at the second step S2, the composite material 5 is irradiated with the laser L to generate the spatters 51 and the fumes 52. At the second step S2, similarly to the processing at the first step S1, upon hole processing by the laser L, assist gas is sprayed from the gas nozzle 14 toward a surface of the composite material 5 and assist gas including the spatters 51 and the fumes 52 is sucked from a suction aperture, which is not illustrated. Thus, the spatters 51 and the fumes 52 are removed.

When the hole processing groove 21 is penetrated through in a depth direction by emitting the laser L, a columnar core material remains inside the hole processing groove 21, and the remaining core material is removed to form the through hole 22 having a columnar shape.

As above, according to the first embodiment, the hole processing groove 21 can be formed on a surface of the composite material 5 with a small heat input amount at the first step S1. Even when a thickness of a composite material is thick, a heat-affected layer can be prevented from being formed on a surface of the composite material 5. In addition, a heat input amount added to a surface of the composite material 5 can be made small. Thus, the spatters 51 and the fumes 52 can be prevented from being generated, and the spatters 51 and the fumes 52 can be prevented from being attached to a surface of the composite material 5. At the second step S2, by emitting the laser L on a plurality of paths so that the laser L is directed from the outside to the inside of the through hole 22, the hole processing groove 21 can be formed deeper along with an irradiation direction of the laser L. Thus, the through hole 22 formed by the laser L can be formed in a straight shape in an irradiation direction of the laser L.

According to the first embodiment, at the second step S2, the laser L can be emitted with the number of paths equal to or more than that at the first step S1. Thus, a length of the hole processing groove 21 in a width direction can be prevented from being shorter than that at the first step S1.

According to the first embodiment, by making a scanning speed of the laser L faster than that at the second step S2, a heat input amount for the composite material 5 by laser irradiation at the first step S1 can be made smaller without changing irradiation conditions of the laser L at the first step S1 and the second step S2.

According to the first embodiment, the pitch between a plurality of respective paths at the first step S1 is the same interval. Thus, a groove depth of the hole processing groove 21 can be equalized. In other words, the bottom surface of the hole processing groove 21 can be smoothed. Similarly, the pitch between a plurality of respective paths at the second step S2 is the same interval. Thus, a groove depth of the hole processing groove 21 can be equalized.

According to the first embodiment, at the second step S2, irradiation of the laser L can be started from an inner peripheral surface of the through hole 22 corresponding to a product surface, thereby performing hole processing on the inner peripheral surface of the through hole 22 with high accuracy.

According to the first embodiment, using an ultrashort pulse laser as the laser L enables the fumes 52 generated by irradiating the composite material 5 with the laser L to be made finer. Thus, the fumes 52 generated at the first step S1 are made finer and can easily float to reduce generation of the fumes 52 attached to the composite material 5.

According to the first embodiment, spraying assist gas toward the hole processing groove 21 at the first step S1 and the second step S2 enables the spatters 51 and the fumes 52 generated by irradiating the composite material 5 with the laser L to be removed with the assist gas. Thus, at the first step S1, the spatters 51 and the fumes 52 attached to the composite material 5 can be prevented from being generated.

In the first embodiment, 3 paths are used at the first step S1 and the second step S2, but this is not particularly limiting, as long as the number of paths is plural. A heat input amount for the composite material 5 is adjusted by making a scanning speed of the laser L faster at the first step S1 and making a scanning speed of the laser L slower at the second step S2, but this configuration is not limiting. Output of the laser L may be smaller at the first step S1 and output of the laser L may be larger at the second step S2 than the output of the laser at the first step S1. In this case, the heat input amount for the composite material 5 at the first step S1 and the second step S2 can be adjusted without changing the scanning speed of the laser L at the first step S1 and the second step S2. In this manner, if the configuration is the one in which a heat input amount for the composite material 5 is smaller at the first step and a heat input amount for the composite material 5 at the second step is larger than the heat input amount at the first step S1, any configuration may be applied.

According to the first embodiment, the through hole 22 is formed into a hollow columnar shape having a circular aperture, but the shape of the through hole 22 is not particularly limiting. For example, the shape of an aperture may be polygonal, and any shape may be applied.

Second Embodiment

Figure 5:
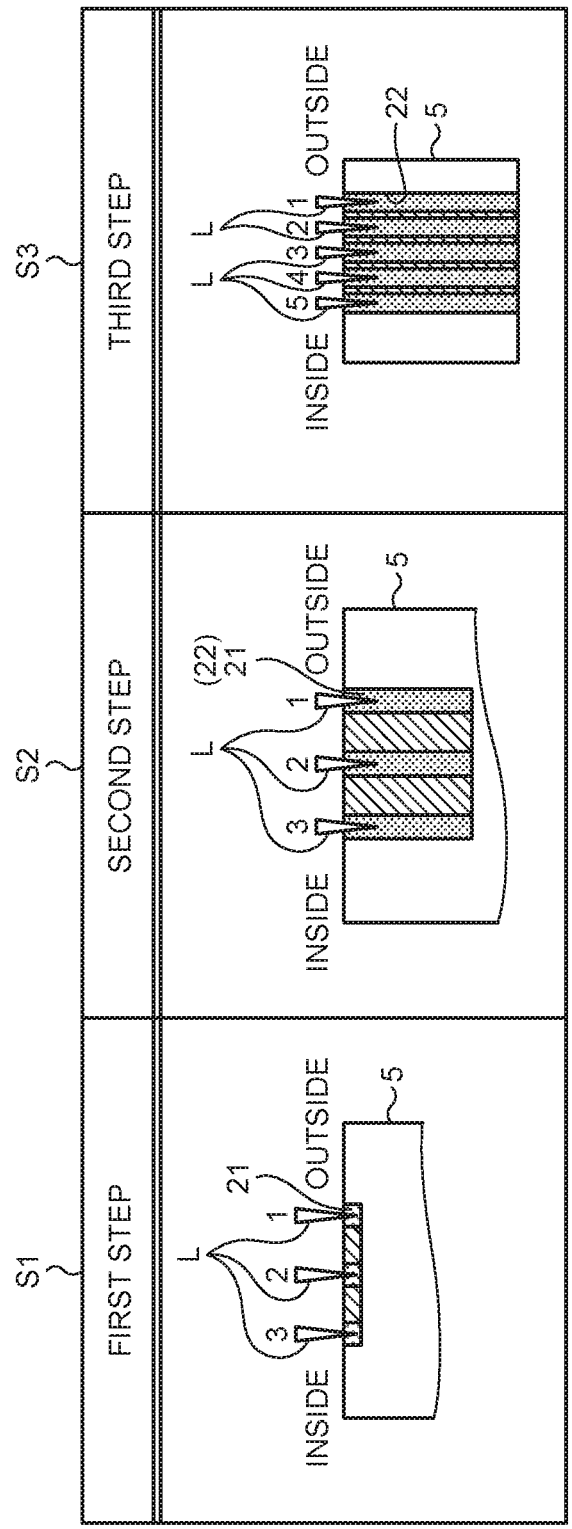
FIG. 5 is an explanatory view related to processing conditions of the laser processing method in accordance with a second embodiment.
Figure 6:
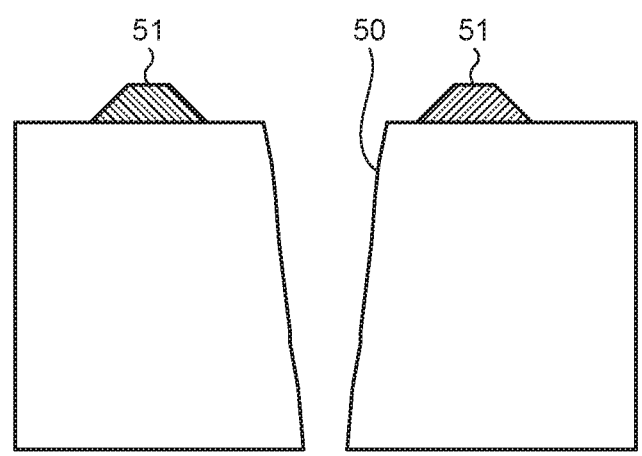
FIG. 6 is a cross-sectional view of a through hole formed by a laser processing method in accordance with a conventional way.

A laser processing method according to a second embodiment will now be described with reference to FIG. 5. In the second embodiment, in order to avoid overlapped description, a part different from that of the first embodiment is described, and like reference signs are given to components having the same configuration as that of the first embodiment. FIG. 5 is an explanatory view related to processing conditions of the laser processing method in accordance with the second embodiment.

In the laser processing method of the second embodiment, processing at a third step S3 is executed after processing at the second step S2. At the third step S3, the through hole 22 is irradiated with the laser L in which the pitch between the respective paths in a width direction is narrower than that at the second step S2.

As illustrated in FIG. 5, at the third step S3, on a plurality of paths aligned in a radial direction of the through hole 22 (width direction of the hole processing groove 21 before penetration), the laser L is emitted. In the second embodiment, for example, the laser L is emitted on 5 paths. The five paths are defined so that the pitch between the respective paths is the same interval. In this case, a length of the five paths in a width direction is the same as that of the three paths in a width direction at the second step S2. Thus, as much as the number of paths at the third step S3 is larger than the number of paths at the second step S2, the pitch between the respective paths at the third step S3 is narrower than the pitch at the second step S2. Even at the third step S3, the laser L scans and is emitted so that the laser L is directed from an inner peripheral surface side of the through hole 22 to a center side of the through hole 22 similarly to the processing at the first step S1 and the second step S2.

FIG. 5 illustrates that processing at the third step S3 is executed before a remaining core material is removed at the second step S2. Processing at the third step S3 may be executed after a core material is removed. At the third step S3, the laser L scans an inner peripheral surface side of the through hole 22 in a peripheral direction for one revolution to perform irradiation of the first path. Subsequently, after irradiation of the first path, the laser L scans the inside by a predetermined pitch from the first path and scans the inside of the first path in a peripheral direction for one revolution to perform irradiation of the second path. Because irradiation of the laser L on the third path to the fifth path is the same as that on the second path, the explanation is omitted. In this manner, at the third step S3, by irradiating the through hole with the laser L on a plurality of paths having a narrower pitch than that at the second step S2, an inner peripheral surface of the through hole 22 can be smoothed in a penetration direction thereof.

Similarly to the processing at the first step S1 and the second step S2, assist gas is sprayed from the gas nozzle 14 toward a surface of the composite material 5 at the third step S3.

As above, according to the second embodiment, executing processing at the third step S3 enables an inner peripheral surface of the through hole 22 to be smoothed in a penetration direction and hole processing to be performed on the through hole 22 with high accuracy.

In the second embodiment, at the third step S3, the number of paths is larger than that of the second step S2, but the number of paths is not particularly limited. At the third step S3, if the pitch between the respective paths is narrower than that at the second step S2, the number of the paths may be any number. For example, the number of paths may be the same as that at the second step S2. When the number of paths at the third step S3 is the same as that at the second step S2, irradiation of the laser L may be started from an inner peripheral surface side of the through hole 22.

REFERENCE SIGNS LIST

5 Composite material
6 Support base
10 Laser processing apparatus
11 Laser oscillator
12 Scanning optical system
13 Condensing optical system
14 Gas nozzle
15 Controller
21 Hole processing groove
22 Through hole
L Laser

The invention claimed is:

1. A laser processing method for performing hole processing in which a composite material is irradiated with a laser to form a through hole using a laser processing apparatus, the laser processing method comprising:
 a first step of irradiating a surface of the composite material with the laser to form a hole processing groove on the composite material by scanning first paths from an outside corresponding to an inner peripheral surface side of the through hole to be formed to an inside corresponding to a center side of the through hole to be formed, the first paths extending across a width direction of the hole processing groove;
 a second step of irradiating and penetrating through the hole processing groove with the laser to form the through hole by scanning second paths from the outside to the inside after the first step, the second paths extending across the width direction of the hole processing groove; and
 a third step of irradiating the through hole with the laser by scanning third paths after the second step, a pitch between the third paths being narrower than a pitch between the second paths,
 wherein:
 the laser used at the first step has a smaller heat input amount per unit time than the laser used at the second step; and
 the laser processing apparatus comprises:
 a laser oscillator configured to irradiate the surface of the composite material with the laser;
 a laser scanner configured to cause the laser to scan;
 a gas nozzle configured to spray assist gas toward the surface of the composite material or in a lateral direction intersecting an irradiation direction of the laser; and
 a controller configured to control operations of the laser oscillator and the laser scanner.

2. The laser processing method according to claim 1, wherein a number of the second paths is equal to or more than a number of the first paths.

3. The laser processing method according to claim 1, wherein a scan speed of the laser used at the first step is faster than a scan speed of the laser used at the second step.

4. The laser processing method according to claim 1, wherein an output of the laser used at the first step is smaller than an output of the laser used at the second step.

5. The laser processing method according to claim 1, wherein:
 the first paths include three or more paths;
 the second paths include three or more paths; and
 a pitch between the first paths is equal to the pitch between the second paths.

6. The laser processing method according to claim 1, wherein irradiation of the laser is started from an inner peripheral surface of the through hole corresponding to a product surface of the through hole at the second step.

7. The laser processing method according to claim 1, wherein the laser is an ultrashort pulse laser or a short pulse laser.

8. The laser processing method according to claim 1, wherein the first step includes spraying the assist gas toward the hole processing groove to be formed, from the lateral direction intersecting the irradiation direction of the laser.

9. The laser processing method according to claim 1, wherein the composite material has a sheet thickness of 10 mm or more.

10. A laser processing apparatus for performing hole processing in which a composite material is irradiated with a laser to form a through hole, the laser processing apparatus comprising:
 a laser oscillator configured to irradiate a surface of the composite material with the laser;
 a laser scanner configured to cause the laser to scan;
 a gas nozzle configured to spray assist gas toward the surface of the composite material or in a lateral direction intersecting an irradiation direction of the laser; and
 a controller configured to control operations of the laser oscillator and the laser scanner,
 wherein the controller is configured to execute:
 a first step of irradiating the surface of the composite material with the laser to form a hole processing groove on the composite material by scanning first paths from an outside corresponding to an inner peripheral surface side of the through hole to be formed to an inside corresponding to a center side of the through hole to be formed, the first paths extending across a width direction of the hole processing groove;
 a second step of irradiating and penetrating through the hole processing groove with the laser to form the through hole by scanning second paths from the outside to the inside after the first step, the second paths extending across the width direction of the hole processing groove; and
 a third step of irradiating the through hole with the laser by scanning third paths after the second step, a pitch between the third paths being narrower than a pitch between the second paths, and
 wherein the laser used at the first step has a smaller heat input amount per unit time than the laser used at the second step.

11. The laser processing apparatus according to claim 10, wherein the composite material has a sheet thickness of 10 mm or more.

12. The laser processing apparatus according to claim 10, wherein the laser is an ultrashort pulse laser or a short pulse laser.

* * * * *